Patented Oct. 25, 1949

2,485,945

UNITED STATES PATENT OFFICE 2,485,945

HYDROCARBON SYNTHESIS PROCESS AND CATALYST THEREFOR

Scott W. Walker, Tulsa, Okla., assignor to Stanolind Oil and Gas Company, Tulsa, Okla., a corporation of Delaware No Drawing. Application August 26, 1947, Serial No. 770,749

8 Claims. (Cl. 260—449.6)

This invention relates to a catalyst for the synthesis of hydrocarbons from carbon monoxide and hydrogen. More particularly it relates to a new form of iron catalyst especially adapted for use in fluidized form in the synthol process in which a stream of carbon monoxide and hydrogen, usually with a volumetric ratio of hydrogen to carbon monoxide in the range of about 2 to 5, is passed upwardly thru a turbulent mass of a finely divided catalyst under controlled temperature conditions.

In the so-called synthol process employing fluidized iron catalyst, considerable difficulty has been encountered with defluidization of the catalyst which has resulted in "balling up" of the catalyst into masses which either adhere to the interior walls of the reactor or drop to the bottom of the reactor, allowing the reaction gases to by-pass the catalyst and pass thru incompletely converted or substantially unchanged. The cause of this phenomenon is obscure but is thought to be the result of deposition on the catalyst of non-volatile reaction products having a binding action on the particles.

Another difficulty encountered in conducting the synthol reaction with fluidized iron catalyst has been "fluffing" or excessive carbonization resulting from an undesirable product distribution which leads to the formation of carbon or highly carbonaceous products which serve to disintegrate the catalyst in some obscure manner and to carry the catalyst out of the reactor with the reaction product gases and vapors. Fluffing is accompanied by reduction in apparent density of the fluidized catalyst mass.

Numerous attempts have been made to overcome these difficulties by proper selection and preparation of the iron catalyst which is usually prepared by reduction of the oxide in the presence of hydrogen. I have now found that the above difficulties can be overcome to a large extent by preparing the catalyst from a magnetic oxide of iron in laminar form as it is produced on the surface of metallic iron which is subjected to hot milling operations as in hot rolling, forging or drawing operations such as in the manufacture of iron sheets, rods, tubes, rails, and rolled shapes. This oxide is commonly known as "scale" or "mill scale." When obtained from blooming mills it is also called "bloom scale." In these processes, the iron is generally in the form of steel containing 0.1 to 1 per cent of carbon and varying amounts of other alloying or modifying elements, usually less than 1 per cent, such as cobalt, copper, nickel, manganese, vanadium, chromium, molybdenum, silicon, aluminum and titanium, and traces of impurities such as sulfur and phosphorus. In the case of cobalt, the amount may be as much as 10 to 25 per cent, if a cobalt-type catalyst is desired.

The metal is passed thru suitable rolling and shaping machinery at a temperature above red heat, for example 1000 to 1300° C. Under these conditions the surface of the metal is oxidized with the formation of a dense film or layer of an oxide whose composition conforms largely to that represented by the formula $Fe_3O_4$ but with varying amounts of other iron oxides in solid solution. The thickness of the film or layer of oxide or "mill scale" varies with the temperature and time of exposure to the air or oxygen and usually varies from about 20 to 300 microns. It is separated from the metal during hot or cold working or by hammering, rolling, scraping or brushing, and it is usually available in the form of dense platelets.

In preparing fluidized synthol catalyst from the oxide scale, it is first ground to about 100 mesh or finer, a typical screen analysis being as follows:

|  | Per cent |
|---|---|
| 40–100 mesh | 20 |
| 100–325 mesh | 67 |
| Thru 325 mesh | 13 |

After grinding to the desired particle size, the oxide is preferably impregnated with an alkali metal salt as a promoter—usually about 0.5 to 2 per cent based on the alkali metal oxide is effective. The promoter may be added in the form of a solution of a carbonate, nitrate or other suitable salt, for example $K_2CO_3$, $NaNO_3$, etc.

After applying the promoter, the oxide is subjected to reduction at an elevated temperature in the presence of hydrogen, to convert it, at least in part, to metallic iron. The temperature of the reduction may vary over a considerable range, for example 600 to 1000° F., the preferred temperature being about 700 to 800° F. The reduction usually requires about 48 to 72 hours at the preferred temperature, higher temperatures requiring less time. If desired, the promoter can be added after the reduction step and the scale can also be reduced before grinding, but these procedures are less preferred. In grading the catalyst to size, use may be made of its magnetic properties by employing a magnetic field for the purpose.

Following the reduction step, it is sometimes desirable to subject the catalyst to a high temperature stabilization treatment or "sintering"

by heating in the presence of hydrogen for a short time, usually 2–12 hours, at a temperature of about 1200 to 1400° F. By this treatment the density of the finer particles is increased and the resulting catalyst resists disintegration somewhat better than if employed directly after the reduction step. This step may be dispensed with, however.

In a typical example, 100 pounds of mill scale were ground to pass a 100 mesh screen and then impregnated with 1.5 pounds of $K_2O$ in the form of a water solution of potassium carbonate. After drying, the catalyst was reduced in hydrogen at a temperature of about 735° F., the hydrogen pressure being maintained at about 100 p. s. i. No additional sintering step was applied to this lot of catalyst. Contact of the catalyst with oxygen was avoided in handling.

15 pounds of the catalyst were charged to the synthol reactor which was a part of the process laboratory unit. The reactor had an internal diameter of two inches and a height of about twenty feet. A feed gas mixture was then passed thru the reactor for a period of 350 hours (run 12). The gas mixture had the following composition:

| | Per cent by volume |
|---|---|
| $H_2$ | 30 |
| CO | 10 |
| $CO_2$ | 17 |
| $N_2$ | 23 |
| $CH_4^+$ | 20 |

The reactor was maintained at a temperature of approximately 600° F. thruout the run. The pressure was maintained at about 200 p. s. i. At the beginning of the run, the conversion of CO to hydrocarbons, $CO_2$ and products of higher molecular weight was about 63% but this increased gradually until at the end of the run the conversion was 85%. The rate of gas input was 80 cubic feet of gas per hour per pound of catalyst (VHW) based on the volume of gas calculated at normal temperature and pressure. The density of the catalyst bed remained high thruout the run, being above 100 pounds per cubic foot initially, and dropping to 30 pounds per cubic foot after 400 hours. The loss of catalyst from the reactor by disintegration and dispersion in the product gases was very slight—much less than catalyst previously prepared from other forms of iron oxide.

The reaction product gases were treated in the usual way for the recovery of valuable products by cooling and absorption to recover hydrocarbons and other products including oxygenated compounds, alcohols, acids, aldehydes and ketones.

During the experimental operation just described, no trouble was encountered with defluidization of the catalyst and this is ascribed to the plate-like structure of the catalyst particles which retain their laminar structure even after grinding. Altho the mill scale oxide is not a product of fusion, its ruggedness suggests that the unique manner by which the oxide is formed on the surface of the metal in progressive layers is a factor affecting its behavior as a catalyst. The oxide is formed on the surface of the metal beneath the film of oxide which is already present, a mechanism suggestive of the growth of integument on certain plants. This method of formation of oxide from which the catalyst is produced appears to result in successive layers which give to the ground catalyst a laminar structure, aiding fluidization in the synthol reactor. Microscopic examination of the ground scale clearly shows the laminar structure, the major axis usually being about three to ten times the thickness.

In another example, a catalyst made by grinding bloom scale to 100 mesh or finer and impregnating with potassium carbonate was charged to a reactor 8 inches in diameter and 30 feet high. The amount of catalyst charged was 214 pounds, reduction of the catalyst being carried out within the reactor at about 700–750° F. and 50 p. s. i. hydrogen pressure for seventy hours. Analysis of the catalyst showed 97.1% total iron and 95.5% metallic iron with $K_2O$ content—0.38%. The screen analysis was:

| | Per cent |
|---|---|
| On 100 mesh | 23 |
| 100–140 mesh | 32.8 |
| 140–200 mesh | 19.8 |
| 200–325 mesh | 19.8 |
| 325 up mesh | 4.6 |

The effect of varying the synthesis temperature was studied by operating the reactor as follows:

600° F. for 4 days
620° F. for 2 days
640° F. for 4 days
660° F. for 2 days
600° F. for 5 days
580° F. after 5 days All operating variables except temperature were held constant as follows:

| | |
|---|---|
| Linear velocity | 0.60–0.65 ft./sec. |
| Pressure | 250 p. s. i. absolute |
| Recycle gas ratio | 1.7 |
| $H_2$:CO ratio in fresh feed | 2.6 to 1 |

Catalyst temperatures were controlled by varying the preheat temperature on the feed and holding the cooling jacket temperature on the reactor nearly constant. The results are shown in the following table:

*Effect of temperature on Bloom scale catalyst*

| Catalyst Age, Hrs | 20 | 68 | 92 | 116 | 140 | 164 | 235 | 259 | 283 | 355 | 404 | 477 | 499 |
|---|---|---|---|---|---|---|---|---|---|---|---|---|---|
| Average Cat. Temp., °F | 600 | | | 620 | | 640 | | 660 | | 600 | | 580 | |
| Per cent conversion, based on CO in total feed | 86.3 | 81.2 | 81.5 | 84.0 | 82.1 | 81.1 | 78.4 | 80.0 | 78.9 | 85.3 | 86.6 | 89.0 | 87.2 |
| Per cent C to: | | | | | | | | | | | | | |
| $CO_2$ | 5.9 | 4.2 | 5.2 | 7.0 | 7.8 | 7.9 | 9.3 | 7.3 | 9.2 | 11.7 | 9.3 | 8.9 | 10.6 |
| $C_1$ and $C_2$'s | 26.4 | 24.6 | 31.5 | 31.4 | 27.6 | 26.1 | 27.7 | 39.4 | 26.3 | 22.1 | 21.3 | 20.0 | 19.8 |
| $C_3$= and $C_4$= | 21.4 | 16.9 | 20.4 | 18.8 | 19.9 | 19.8 | 20.8 | 13.4 | 18.0 | 20.1 | 21.4 | 22.6 | 21.4 |
| $C_3$ and $C_4$ | 4.1 | 5.9 | 5.4 | 4.9 | 5.6 | 5.7 | 3.5 | 2.9 | 3.2 | 3.5 | 4.5 | 3.6 | 4.3 |
| $C_5$'s and Heavier | 35.5 | 41.5 | 32.0 | 31.1 | 32.2 | 33.3 | 31.2 | 29.4 | 34.8 | 31.4 | 32.8 | 32.4 | 31.8 |
| Oxy Compounds | 6.6 | 6.8 | 5.6 | 6.7 | 6.9 | 7.2 | 7.5 | 7.7 | 8.5 | 11.2 | 10.6 | 12.6 | 12.1 |
| Rate of Density Decline, lbs./ft.$^3$/hr | | .04 | | | .28 | 0.0 | | 0.0 | | .07 | | | |
| Carbon Deposition, Lbs./100 Fe/hr | | .03 | | | .09 | .05 | | .01 | | .03 | | | |
| Fines Produced Δ per cent of −325 mesh/hr | | .12 | | | .08 | .36 | | .08 | | .05 | | | |

As indicated in the table, raising the temperature from 600 to 660° F. in the first 300 hours had no appreciable effect on CO conversation, rate of catalyst density decline, rate of carbon deposition, or rate of fines production in the catalyst. Average combined yields of $C_3^+$ oil and oxygen compounds for each temperature showed a slight decline from 67.4 to 64.5 per cent.

Subsequent operation at 600° and 580° F. showed the catalyst to be more active for CO conversion than at the start of the run. Selectivity to oil at 600° was lower than that in the earlier 600° F. operation, but operation at 580° resulted in an increased selectivity to oil from 56.9 to 58.5 per cent.

Oxygenated compound yields continued to increase at the lower temperatures, indicating that the yield of these materials is a function of the changing character of the catalyst with age. In contrast, the yield of $C_3^+$ oil apparently is a function of both catalyst age and temperature, lower temperatures and fresh catalyst resulting in improved yields.

Gas samples were taken from the reactor effluent before and after leaving the filters located at the top of the reactor to prevent escape of catalyst. Analysis of these gas samples showed that the 4.4 to 6.6 per cent of the CO conversion occurred at the filters.

Having thus described my invention what I claim is:

1. In the process of converting carbon monoxide and hydrogen gases into hydrocarbons wherein a mixture of said gases, in which the volumetric ratio of hydrogen to carbon monoxide is about 2 to 5, is contacted with a finely divided fluidized iron catalyst at a temperature of about 550 to 700° F. and a pressure of about 100 to 600 pounds per square inch, and said catalyst has a tendency to defluidize or "ball-up," the improvement comprising employing as the catalyst for said process a finely divided metallic iron in plate-like form resulting from the reduction at elevated temperature of iron oxide scale obtained as a film on the surface of metallic iron exposed to air at a temperature above red heat under conditions at which only the surface of the iron is oxidized.

2. The process of claim 1 wherein said finely divided iron catalyst is promoted with about 0.5 to 2 per cent of an alkali metal compound.

3. The process of claim 1 wherein said plate-like iron catalyst is subjected to sintering in the presence of hydrogen at a temperature of about 1200 to 1400° F. before contacting with said hydrogen-carbon monoxide gas mixture.

4. The process of converting carbon monoxide and hydrogen into higher molecular weight products which comprises contacting a mixture of hydrogen and carbon monoxide at an elevated temperature with a finely divided fluidized iron catalyst in laminar form maintained in turbulent state in a reaction zone, said catalyst having been prepared by the reduction of mill scale with hydrogen.

5. The process of claim 4 wherein the catalyst contains a small amount of an alkali metal compound activator.

6. The process of claim 4 wherein the catalyst contains a small amount of a potassium compound activator.

7. A hydrogenation catalyst comprising finely divided laminar iron particles prepared by grinding mill scale to a particle size of about 100 mesh and finer, activating the catalyst by the addition thereto of a small amount of an alkali metal compound and reducing it with hydrogen at an elevated temperature to produce the desired laminar iron catalyst.

8. The catalyst of claim 7 wherein said catalyst is activated with a potassium compound in the amount of about 0.5 to 2 per cent $K_2O$ basis.

SCOTT W. WALKER.

REFERENCES CITED

The following references are of record in the file of this patent:

UNITED STATES PATENTS

| Number | Name | Date |
|---|---|---|
| 2,220,261 | Michael et al. | Nov. 5, 1940 |
| 2,276,693 | Heath | Mar. 17, 1942 |
| 2,282,124 | Fahrenwald | May 5, 1942 |
| 2,365,094 | Michael et al. | Dec. 12, 1944 |
| 2,417,164 | Huber | Mar. 11, 1947 |